(12) United States Patent
Schreiber

(10) Patent No.: US 6,680,856 B2
(45) Date of Patent: Jan. 20, 2004

(54) POWER CONVERTER CIRCUIT ARRANGEMENT FOR GENERATORS WITH DYNAMICALLY VARIABLE POWER OUTPUT

(75) Inventor: Dejan Schreiber, Zirndorf (DE)

(73) Assignee: Semikron Elektronik GmbH, Nuremburg (DE)

( * ) Notice: Subject to any disclaimer, the term of this patent is extended or adjusted under 35 U.S.C. 154(b) by 55 days.

(21) Appl. No.: 10/104,474

(22) Filed: Mar. 22, 2002

(65) Prior Publication Data

US 2003/0202367 A1 Oct. 30, 2003

(30) Foreign Application Priority Data

Mar. 22, 2001 (DE) .......................................... 101 14 075

(51) Int. Cl.[7] ................................................ H02M 7/00
(52) U.S. Cl. ......................... 363/71; 363/37; 363/124; 307/82
(58) Field of Search .............................. 363/34, 37, 65, 363/71, 124; 307/82

(56) References Cited

U.S. PATENT DOCUMENTS

| | | | | |
|---|---|---|---|---|
| 5,019,952 A | * | 5/1991 | Smolenski et al. | ........... 363/16 |
| 5,652,485 A | * | 7/1997 | Spiegel et al. | ............. 318/147 |
| 5,771,163 A | * | 6/1998 | Moriguchi et al. | ........... 363/71 |
| 6,128,204 A | * | 10/2000 | Munro et al. | ................. 363/41 |
| 6,498,320 B2 | * | 12/2002 | Moriguchi et al. | .... 219/130.21 |

FOREIGN PATENT DOCUMENTS

| | | |
|---|---|---|
| DE | 198 32 226 A1 | 1/2000 |
| DE | 198 32 255 C2 | 1/2000 |

OTHER PUBLICATIONS

Derwent WPI; "Four Quadrant Convertor For Use With Mid and High Voltage For Direct Conversion of Amplitude And Frequency Variable Outputs"; DE 19832225 A1; Derwent Class: X12, no date.

Derwent WPI; "Four Quadrant Convertor For Amplitude Or Frequency Modulated Output Using A Combindation Of Single Phase Converters"; DE 19832226 A1;###Derwent Class: X12, no date.

* cited by examiner

Primary Examiner—Michael Sherry
Assistant Examiner—Gary L. Laxton
(74) Attorney, Agent, or Firm—Darby & Darby

(57) ABSTRACT

A power converter circuit for wind power devices which feed into a high-voltage grid consisting of a power converter circuit arrangement to transform the variable frequency and variable voltage alternating current generated in the AC voltage generator into DC. The DC is chopped to again produce AC but with a fixed frequency and voltage. The power converter consists of a cascaded serial arrangement of several power converter cells. The power converter cells are made dynamically active or inactive by the master control unit, depending on the power being generated by the AC voltage generator. Each phase of each power converter cell supplies a primary winding of an output transformer.

11 Claims, 2 Drawing Sheets

POWER CONVERTER CIRCUIT ARRANGEMENT FOR GENERATORS WITH DYNAMICALLY VARIABLE POWER OUTPUT

BACKGROUND

The invention relates to a power converter circuit arrangement for use as a transformer between a generator with a dynamically variable output and a medium-voltage power grid. Such dynamically variable outputs occur, for example, in wind energy devices, where the generated power depends on the wind velocity. Typically, the generated currents are fed into power grids of up to tens of kV voltage at frequencies of 50 Hz or 60 Hz.

In the prior art, applications such as wind energy devices, where the current produced by the generators is temporally variable, consist of the following technologies:

For power outputs of up to 1 MW, generators with voltages of up to 690 V are used. This means that the voltage in the intermediate circuit, or in the DC connection to the power converter, lies at about 1100 V. In the associated power converter circuits, IGBTs (insulated gate bipolar transistors) are often used as power switches for a voltage of 1200 V or 1700 V. However, these intermediate circuit voltages of 1100 V are too low for higher power outputs. Since transmission losses increase as the square of the current, higher voltages, which reduce the current, reduce losses. The lower voltages of 1100 V or so result in excessive losses, for example in power lines.

For that reason, medium-voltage generators of the standardized voltage classes of 2.2 kV, 3.3 kV, 4.16 kV and 6.3 kV are used in power generation with outputs starting at about 1 MW. The resulting high intermediate circuit voltages require high-voltage power switches such as IGBTs or IGCTs (integrated gate commutated thyristors). However, these high-voltage versions have the disadvantage that power losses are higher by a factor of 3 to 10 in comparison with the standard versions.

The generators used for the above mentioned technologies are asynchronous machines. However, these robust generators require four-quadrant transformers, such as the examples described in DE 198 32 225 A1 and DE 198 32 226 A1, since for excitation, these generators need an input current which is fed in and regulated via the four-quadrant transformer.

The prior art also includes forms of power generation with synchronous machines as generators. For example, in the forms of power generation known here, the rectified output voltages of several generators are connected to a joint power converter circuit. In these, DC voltages generated by means of transformers and downstream rectifiers are used in connection with power converters, which are in the range of 100 kV, since they have low conduction losses. A large number of series-connected high-voltage IGBTs or IGCTs are used as power switches. However, the high intermediate circuit voltage has the disadvantage that such voltages result in relatively slow switching times on the order of about 1 μs, with transient voltage variation values on the order of about 100 kV/μs. To prevent such high-voltage variation values from destroying the coils in the generator and transformer, additional passive LC elements must be integrated as filters.

All these requirements increase the technical complexity and also increase the cost of such power generation systems. Furthermore, the above power converter circuits are not flexibly adaptable to generators of variable voltage and conductor classes.

A further disadvantage in using only one power converter circuit for several generators of dynamic output is the fact that, due to their constant excitation, they do not work at identical speeds and therefore do not provide identical output voltages. For that reason, various kinds of regulating mechanisms are required all of which contribute to higher losses in power generation.

OBJECTS AND SUMMARY

It is an object of the present invention to introduce a power converter circuit that generates a high-quality line voltage and works reliably even at low outputs and with a high degree of efficiency across the entire output range, which feeds the temporally variable output of a power-generating medium-voltage generator into a high-voltage grid, whereby the variable output is based on the variable speed of the generator, which leads directly to a variable output voltage and also to a variable output frequency.

It is a further object of the invention to provide a power converter circuit arrangement that is easily adaptable to variable generator outputs as well as being able to tolerate the failure of individual power switches, whereby such failure does not lead to the failure of or reduction in the power generation output.

These objects are achieved by means of the following substantial components:

- a medium-voltage generator, preferably a permanently excited synchronous machine;
- a rectifier circuit arrangement for transforming the AC voltage produced in the generator into a medium range DC voltage;
- a DC connection in the medium-voltage range from the rectifier circuit arrangement to a power converter configured as a cascaded series-connected arrangement of power converter cells according to the invention;
- a high-voltage transformer for transforming the output voltages of the power converter cells into the voltage required for the power grid;
- and a master control unit.

Thanks to its temporally dynamic variable power output, the generator has an AC voltage $U_{gen}$ between 0V and a few tens of kV. The frequency of the generated voltage varies between 0 Hz and a maximum value of $F_{max}$, which is determined by the type of generator. The generated output also fluctuates between 0W and $W_{max}$, whereby $W_{max}$ should preferably be at least 3MW.

From this, the directly downstream rectifier circuit arrangement produces a DC voltage between 0V and approximately $1.35 \times U_{gen}$. The components of this rectifier circuit arrangement preferably consist of prior-art diodes or thyristors. Thyristors have the advantage that they can decouple the DC transmission lines from the generator in case of a malfunction.

The downstream DC voltage line connects the rectifier circuit arrangement with the power converter. In accordance with the inventive configuration, the latter consists of a cascaded series-connected arrangement of "power converter cells" according to the invention, whereby each of these power converter cells consists of the following:

- a bridging switch for bridging or deactivating the power converter cell;
- an input diode;
- at least one intermediate circuit capacitor;
- an at least single-phase bridge circuit, preferably a 3-phase bridge circuit, for each phase consisting of one power switch in TOP and one in BOT position, each with at least one parallel-connected free-running diode. Each of the power switches in turn preferably consists of a parallel-connection of several power transistors, preferably standard-type IGBTs, since these ensure fewer losses during operation than is the case with high-voltage versions;

one line inductor per phase;

one primary coil of the medium-voltage transformer per phase. The minimum number of power converter cells for a power converter of a given maximum output is determined directly by dividing the maximum DC voltage produced by the generator with a downstream rectifier circuit by the maximum intermediate circuit voltage of a power converter cell. If the number of power converter cells is greater than that minimum, this leads to a redundancy of the power converter, the use of which will be described below.

The inventive use of the power converter cells is described below. The minimum output required for efficient power generation is determined by the medium circuit voltage of an individual power converter cell.

In case of an interim circuit voltage that is lower than or equal to the maximum intermediate circuit voltage $U_{z,max}$ of a power converter cell, the master control uses only a random power converter cell, while all other power converter cells are bridged by means of their bridging switch and are therefore not active. Now, the entire circuit arrangement works like a 3-phase bridge circuit with an input rectifier according to prior art.

The master control is a master circuit with an input of data of different parameters of control conditions of each of the power converter cells, such as their intermediate circuit voltages, and from which master ciruit controls for example, the choice of the actual active or non active power converter cells.

Increasing the generator speed results in an increase in the generator voltage and the rectified DC voltage. As soon as the latter has exceeded the maximum value of the intermediate circuit voltage of a power converter cell, the master control unit will add another power converter cell. Now, two power converter cells are active, the voltage is divided equally among these, and both can work in their ideal operating range again. All other cells are bridged by means of their bridging switches and are inactive. In this operating mode, the master control unit can select any two from among all the power converter cells. This selection is dynamic, i.e., even at a constant power input, i.e., at constant intermediate circuit voltage, dynamic switching back and forth between different groups (in this case, groups of two) of active power converter cells is possible. This can be done according to a fixed rhythm or independently of various parameters such as the temperature of the power switches.

A further increase in generator speed leads to a further increase in transmission DC voltage. As soon as the latter exceeds a value formed by the sum of the intermediate circuit voltages of all active power converter cells, the master control unit adds another power converter cell. This method is continued until the maximum output is reached.

Naturally, an analogous method is used to reduce the active power converter cells. If the generator's power output is temporally dynamic, this leads to a temporally dynamic number of active or passive, i.e., bridged power converter cells. The master control unit can select the necessary number of power converter cells in any operating mode and at any transmission DC voltage. The selection is dynamic, i.e., dynamic switching back and forth between different groups of active power converter cells is possible, whether the power input or intermediate circuit voltage is variable or constant.

When the power converter is operated in a range below the nominal output, not all power converter cells are active. Even with redundantly configured power converters with a larger number of power converter cells than is necessary for operation, the power converter has some inactive power converter cells. These power converter cells can provide reactive power for the grid during periods in which they are not operated as power converter cells.

Briefly stated, the present invention provides a power converter circuit for wind power devices which feed a high-voltage grid consisting of a power converter circuit arrangement to transform the variable frequency and variable voltage alternating current generated in the AC voltage generator into DC. The DC is chopped to again produce AC but with a fixed frequency and voltage. The power converter consists of a cascaded serial arrangement of several power converter cells. The power converter cells are made dynamically active or inactive by the master control unit, depending on the power being generated by the AC voltage generator. Each phase of each power converter cell supplies a primary winding of an output transformer.

According to an embodiment of the invention, there is provided a power converter circuit comprising: a rectifier circuit for transforming AC from an AC voltage generator into DC, a power converter receiving said DC and chopping the DC to generate AC therefrom, medium-voltage primary windings in an output transformer receiving said chopped DC, high-voltage secondary windings in said output transformer for feeding high-voltage power to a high-voltage grid, whereby said high-voltage power is produced from a medium-voltage AC generator with temporally variable frequency, voltage and output, said power converter includes a cascaded, series connection of a plurality of power converter cells, dynamic means for activating individual ones of said plurality of power converter cells in response to an output of said AC voltage generator, and each phase of said power converter cell supplying one medium-voltage primary winding of said output transformer.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
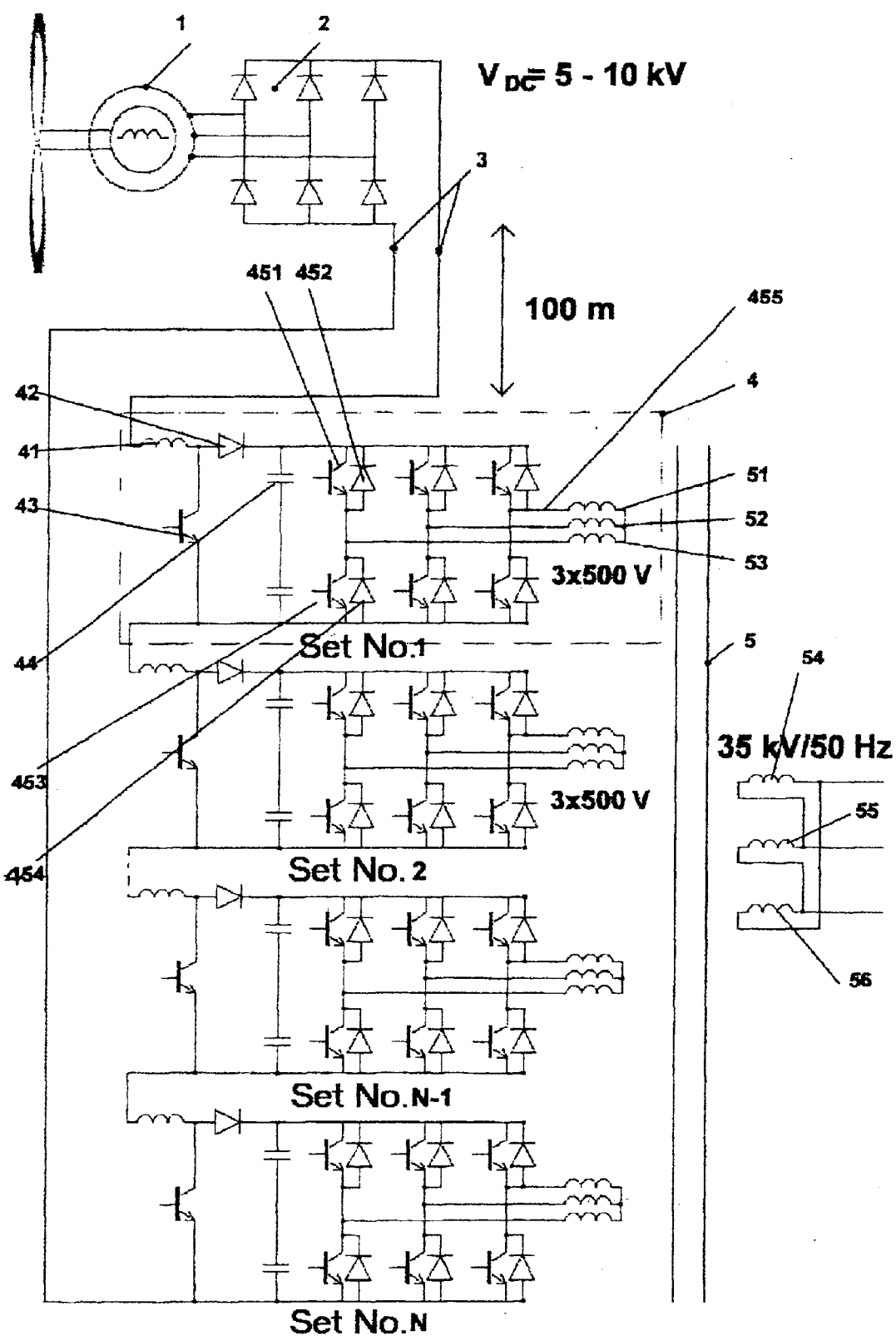
FIG. 1 shows a 6MW wind generator device according to the invention.

Referring to FIG. 1, a wind generating device includes a permanently excited synchronous machine 1 as a generator with a maximum output voltage of 6.6 kV. A bridge rectifier 2 is connected directly the synchronous machine 1. A connecting line 3 transmits the generated DC voltage to a voltage converter, consisting of the power converter cells 4. A high-voltage transformer 5 converts the 6.6 kV power to 35 kV for feeding to a high-voltage network.

Such wind energy devices can be used, for example, for power generation in wind farms located in coastal areas. Typical for such use is that the generator speed varies in accordance with variable wind velocities. The power converter circuit according to the invention allows highly effective power generation at a low level of mechanical complexity while operating between minimum and maximum wind velocities. The minimum and maximum wind velocities are determined by the mechanical conditions under which the wind energy device operates.

The maximum transmission DC voltage produced by generator 1 and the downstream rectifier circuit arrangement 2 (about 9 kV) is connected by a DC voltage line 3 to the cascaded, series-connected power converter cells 4. When 1700 V IGBTs are used as power transistors and the intermediate circuit voltage of the voltage converter cells is a typical 1080 V, ten voltage converter cells are required to convert the transmission DC voltage into a single-phase, or a three-phase AC voltage, which in turn feed energy into the high-voltage grid (50 or 60 Hz) by means of a large transformer. In FIG. 1, the value of N in a 10-cell voltage converter is N=10. This does not yet take into account any redundancy needed for replacing a defective power converter cell with another. Additional power converter cells can be used for the purpose of ensuring the complete power generating function without loss of output, should a power converter cell fail.

Every power converter cell for producing three-phase power consists of:

- a parasitic inductance 41 of the connecting line;
- bridging switch 43 for bridging the power converter cell;
- an input diode 42;
- at least one intermediate circuit capacitor 44 (two capacitors in series are illustrated)
- a 3-phase bridge circuit for each phase, consisting of one power switch 451 in TOP position and one power switch 453 in BOT position, each power switch 451, 453 is connected to at least one parallel-connected free-running diode 452, 454. The power switches 451, 453 consist of several parallel-connected power transistors.

Figure 1A:
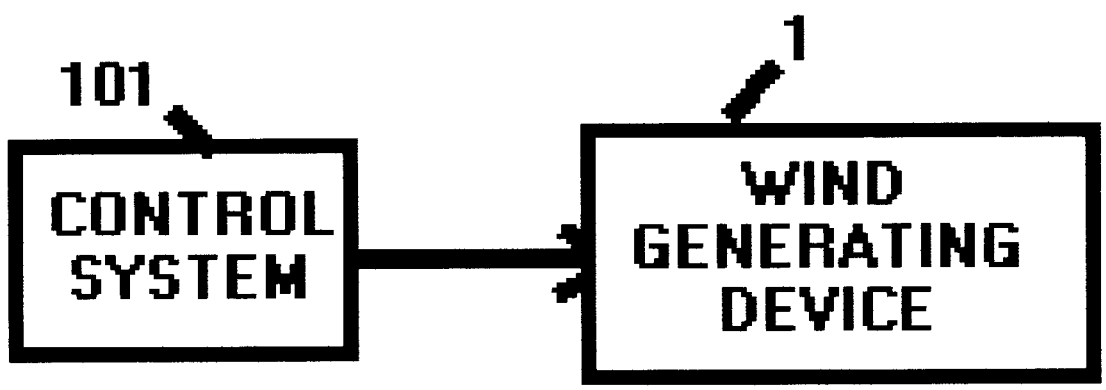
FIG. 1(A) is a system block diagram.

Beginning with a minimum connection DC voltage $U_{z,min}$ up to a minimum connection DC voltage that equals the maximum intermediate circuit voltage $U_{z,max}$ of a power converter cell, the master control unit 101 (FIG. 1(A)), which knows the intermediate circuit voltage, makes only one cell active, while all other cells are bridged via their bridging switch 43, and are therefore inactive. The entire voltage of the intermediate circuit is produced only by the active power converter cell(s), since all inactive power converter cells are bridged. The output signal, which is regulated by the cells' own control, is transmitted to the three primary coils 51, 52, 53 of the medium-voltage transformer 455, which are assigned to this power converter cell. Finally, the output is produced by corresponding secondary coils 54, 55, 56.

At a constant intermediate circuit voltage, the master control unit makes all power converter cells cyclically active to ensure that all power converter cells are utilized equally and thus have the same service life.

When the connection DC voltage rises above 1200 V, the master control unit makes two power converter cells active. Now, the intermediate circuit voltage is reduced to half via the two power converter cells. In this operating mode with two active cells, cyclically different cell pairs are also made active to ensure that all power converter cells are utilized equally.

In general, the master control unit recognizes a rise or drop in intermediate circuit voltage and makes other power converter cells active or inactive, respectively. Thus, the intermediate circuit voltage always drops via the appropriate number of voltage converter cells. The cyclical control of various cell groups or individual cells is also maintained in the case of temporally varying intermediate circuit voltages.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power converter circuit comprising:
   - a rectifier circuit for transforming AC from an AC voltage generator into DC;
   - a power converter receiving said DC and chopping the DC to generate AC therefrom;
   - medium-voltage primary windings in an output transformer receiving said chopped DC;
   - high-voltage secondary windings in said output transformer for feeding high-voltage power to a high-voltage grid, whereby said high-voltage power is produced from a medium-voltage AC generator with temporally variable frequency, voltage and output;
   - said power converter includes a cascaded, series connection of a plurality of power converter cells;
   - dynamic means for activating individual ones of said plurality of power converter cells in response to an output of said AC voltage generator; and
   - each phase of said power converter cell supplying one medium-voltage primary winding of said output transformer.

2. A power converter circuit according to claim 1, wherein said AC voltage generator is a synchronous machine with one of rotor-field control and permanent magnets.

3. A power converter circuit according to claim 1, wherein each of said plurality of power converter cells includes:
   - a bridging switch for bridging and thereby deactivating its power converter cell;
   - an input diode;
   - at least one intermediate circuit capacitor;
   - at least a single-phase bridge circuit;
   - one line inductor; and
   - one primary coil of said medium-voltage transformer.

4. A power converter circuit according to claim 3, wherein:
   - said at least a single-phase bridge circuit includes a three-phase bridge circuit;
   - one line inductor per phase; and
   - one primary winding and one secondary winding of said output transformer per phase.

5. A power converter circuit according to claim 3, wherein:
   - each phase of said power converter cell consists of one power switch in a TOP position and one power switch in a BOT position; and
   - each of said power switches including at least one parallel-connected free-running diode, whereby each of the power switches in turn consists of one parallel-connection of several power transistors.

6. A power converter circuit according to claim 5, wherein said power transistors are insulated gate bipolar transistors.

7. A power converter circuit according to claim 1, wherein an output signal of each active power converter cell is monitored and controlled by its own control circuit.

8. A power converter circuit according to claim 1, wherein a master control unit makes the active power converter cells cyclically active or inactive, respectively, according to at least one of a fixed rhythm and at least one of a measured and calculated parameter.

9. A power converter circuit according to claim 1, wherein:

a number of power converter cells is higher by n than a number that is required by generator output; and said n power converter cells are usable to compensate a function of said power converter circuit without a loss in output, even when as many as n power converter cells fail.

10. A power converter circuit according to claim 1, wherein said power converter circuit is adaptable to various generator output classes by changing the number of power converter cells.

11. A power converter circuit according to claim 1, wherein said medium-voltage primary windings receive reactive power during partial-load operation.

* * * * *

UNITED STATES PATENT AND TRADEMARK OFFICE
CERTIFICATE OF CORRECTION

PATENT NO.    : 6,680,856 B2
DATED         : January 20, 2004
INVENTOR(S)   : Dejan Schreiber It is certified that error appears in the above-identified patent and that said Letters Patent is hereby corrected as shown below:

<u>Title page,</u>
Item [73], Assignee, delete "Semikron Elektronik GmbH, Nuremburg (DE)" and substitute -- Semikron Elektronik GmbH, Nurnberg (DE) --.

Signed and Sealed this

Fifteenth Day of June, 2004

JON W. DUDAS
*Acting Director of the United States Patent and Trademark Office*